March 17, 1964    L. H. HAWTHORNE    3,125,670
WELDING GUNS
Filed Aug. 15, 1957    6 Sheets-Sheet 1
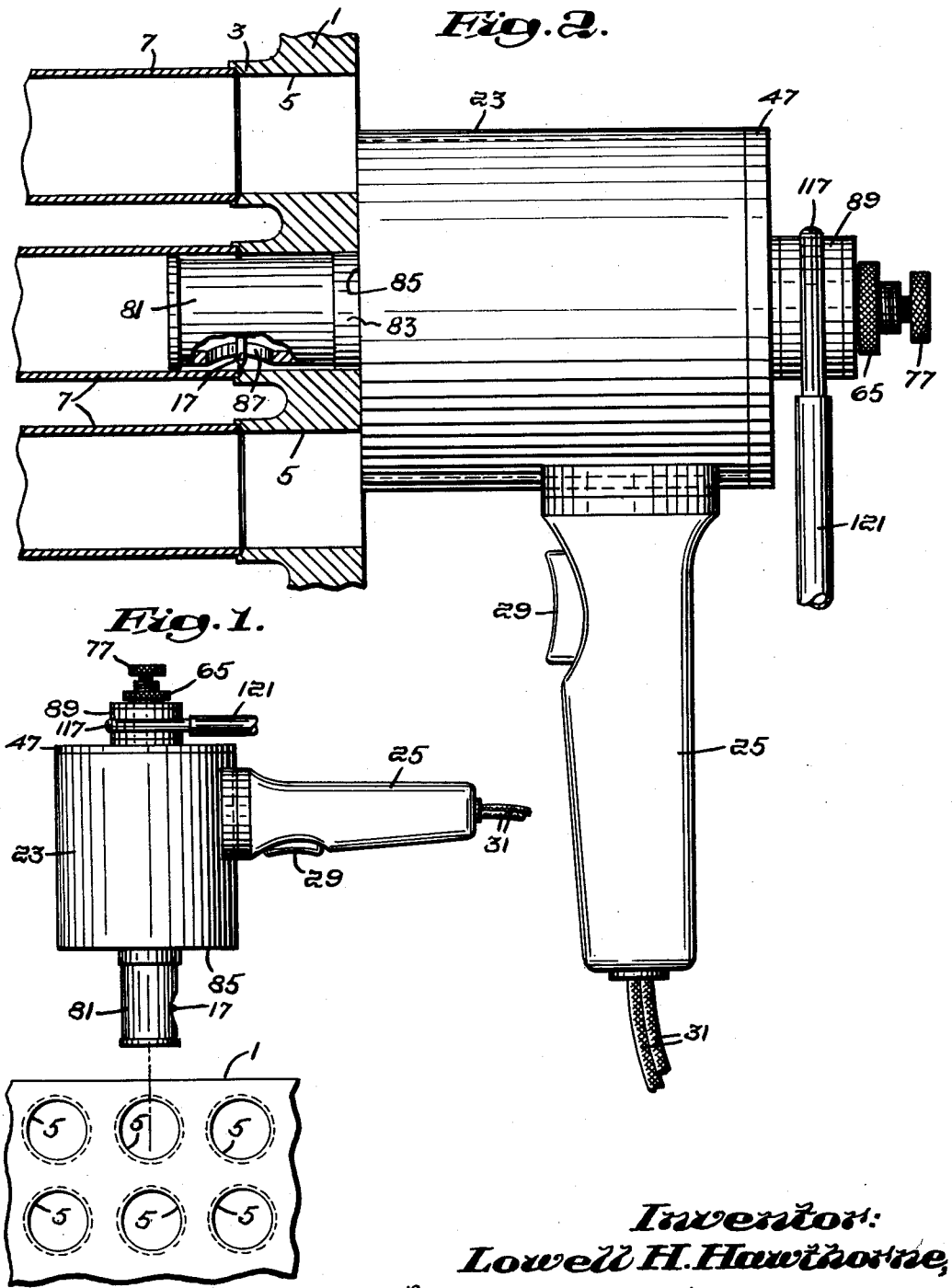
Inventor:
Lowell H. Hawthorne,
by Emery Booth Townsend Meller & Weidner  Attorneys

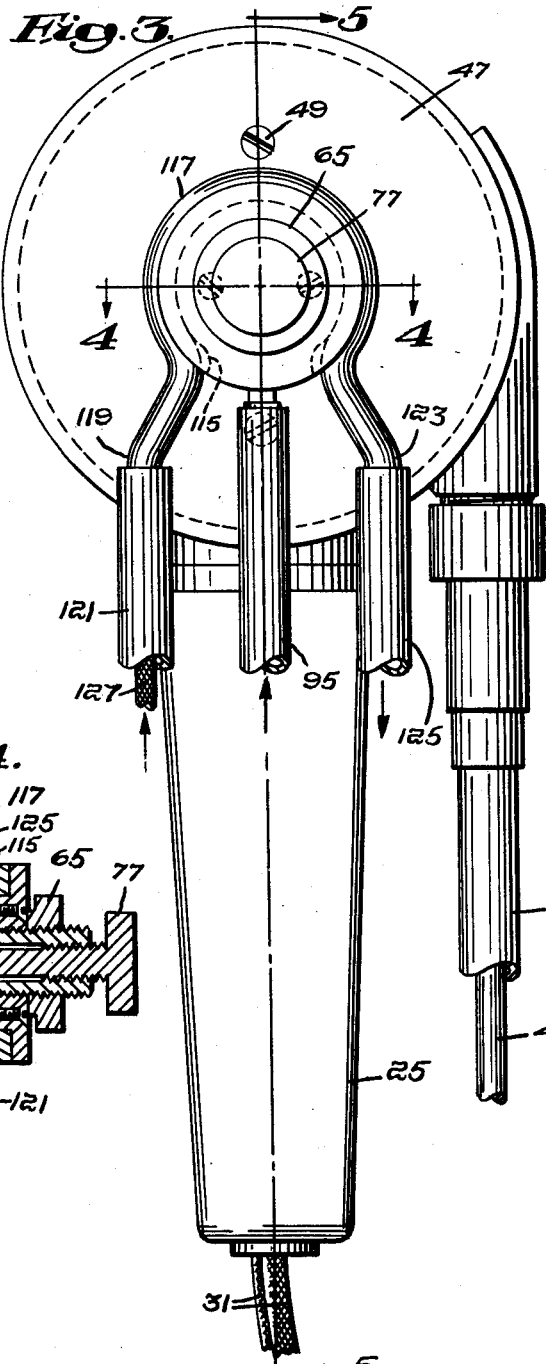

March 17, 1964  L. H. HAWTHORNE  3,125,670
WELDING GUNS
Filed Aug. 15, 1957  6 Sheets-Sheet 3
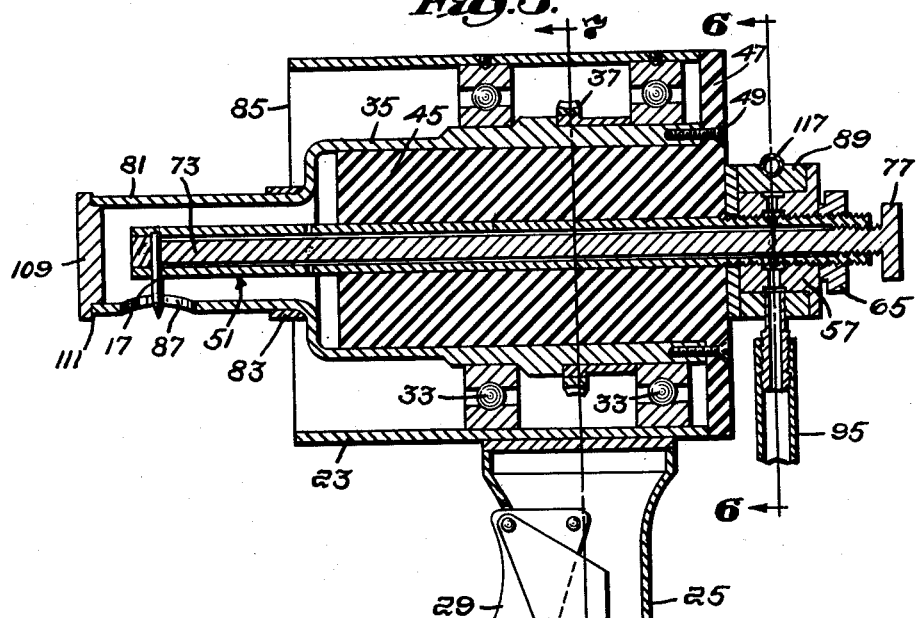
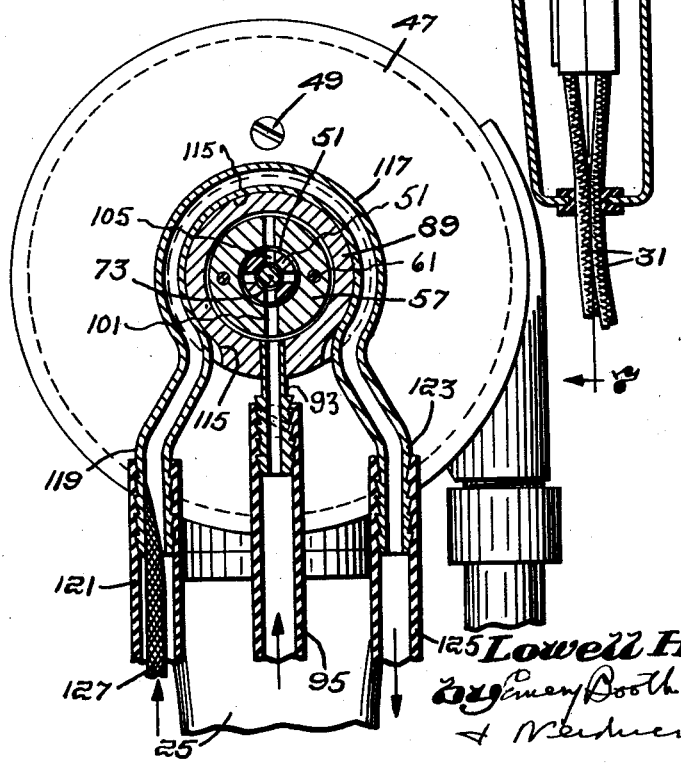
Inventor:
Lowell H. Hawthorne,
by Emery Booth Townsend Miller
& Neilson  Attorneys

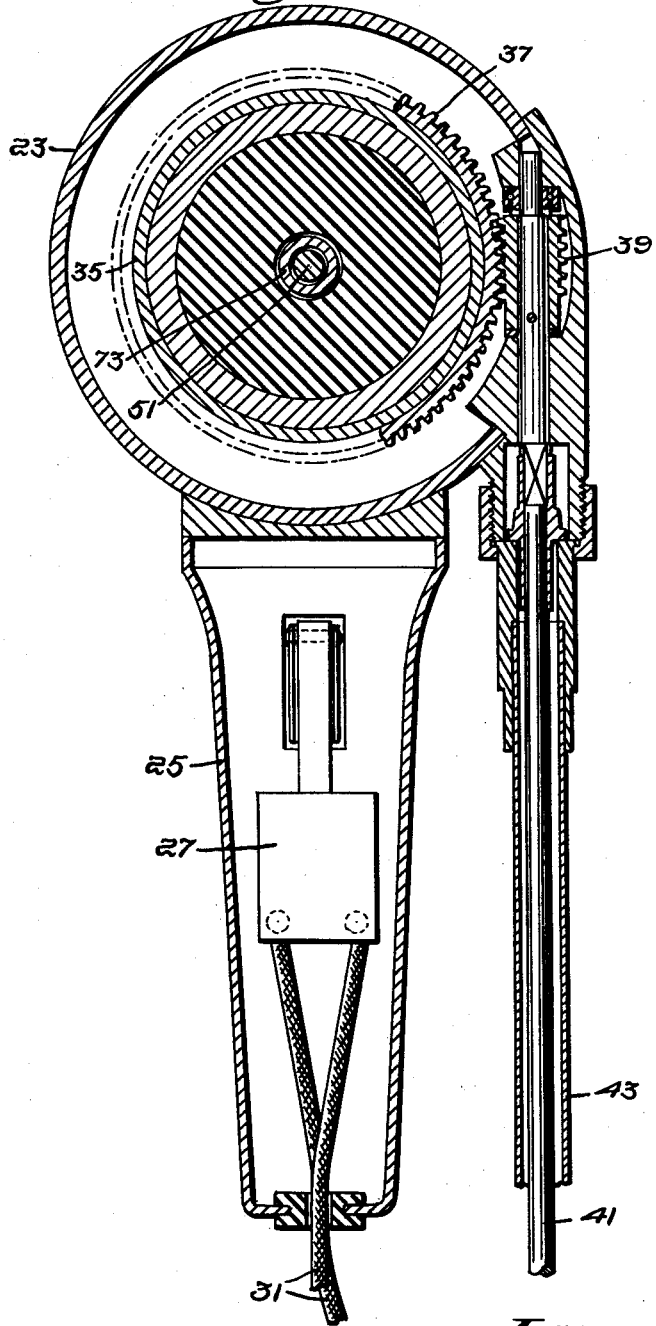

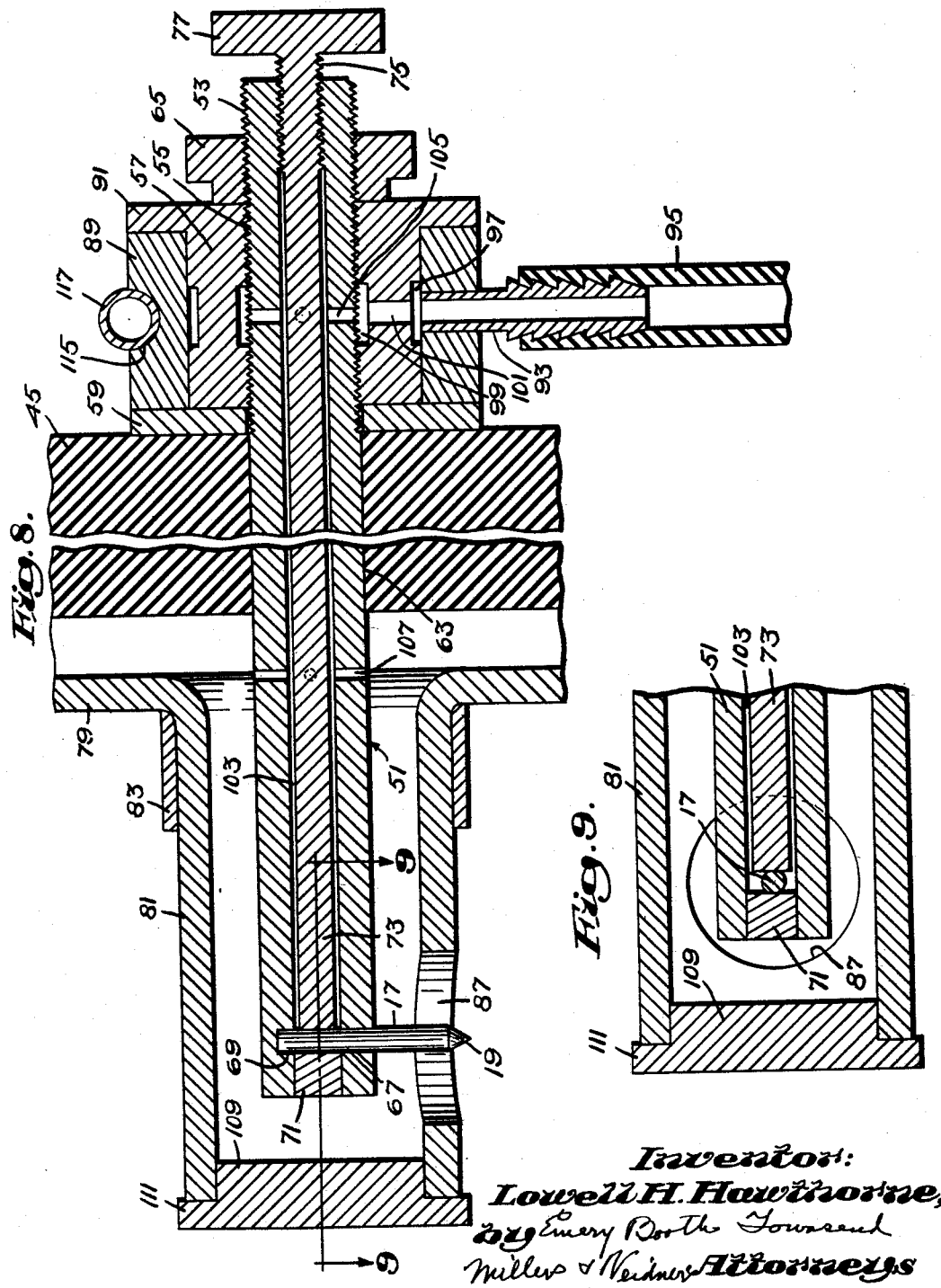

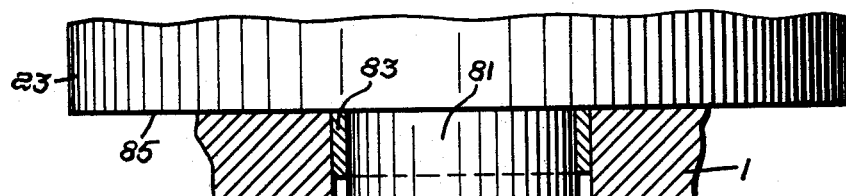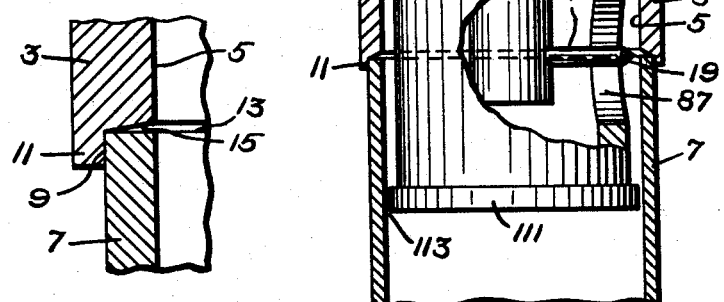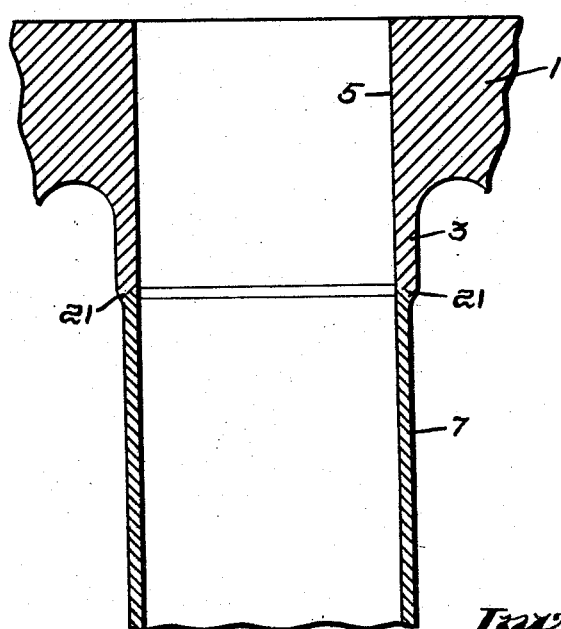

United States Patent Office 3,125,670
Patented Mar. 17, 1964

3,125,670
WELDING GUNS
Lowell H. Hawthorne, Verona, N.Y., assignor to Revere Copper and Brass Incorporated, Rome, N.Y., a corporation of Maryland
Filed Aug. 15, 1957, Ser. No. 678,330
8 Claims. (Cl. 219—125)

My invention relates to welding guns for welding tubes to tube sheets and the like.

The invention has among its objects the provision of a welding gun for arc welding from one side of a tube sheet the joint between the opposite side of that sheet and the end of such tube which contacts said sheet at said opposite side about the edge of a through opening in said sheet in registry with the bore of the tube, the gun being adapted to be positioned at the first mentioned side of the sheet and having a rotary non-consumable electrode which may be inserted from that side through said opening to position the electrode tip in welding relation to said joint. In these respects the present invention constitutes an improvement in and modification of the welding gun forming the subject matter of applicant's pending application Serial Number 619,308, filed October 30, 1956.

The invention, however, will be best understood from the following description when read in the light of the accompanying drawings, while the scope of the invention will be more particularly pointed out in the appended claims.

In the drawings:

FIG. 1 is a combined side elevation of a welding gun according to the invention and a diagram schematically indicating such gun in position to be applied to the tube sheet;

FIG. 2 is a side elevation, with parts in section, of the gun according to FIG. 1 applied to the tube sheet preparatory to welding the end of the tube to that sheet;

FIG. 3 is an end elevation of the gun according to FIG. 2 as viewed from the right of FIG. 2;

FIGS. 4 and 5 are sections on the lines 4—4 and 5—5, respectively, of FIG. 3, FIG. 5 being on a reduced scale;

FIGS. 6 and 7 are sections on the lines 6—6 and 7—7, respectively, of FIG. 5 on an enlarged scale;

FIG. 8 is a section corresponding to a fragment of FIG. 5 on an enlarged scale with parts broken away;

FIG. 9 is a section on the line 9—9 of FIG. 8;

FIG. 10 is a fragment of FIG. 2 on an enlarged scale showing the electrode in welding position with relation to the joint to be welded;

FIG. 11 is a fragment of FIG. 10 on an enlarged scale; and

FIG. 12 is a section showing the tube sheet and tube after the joint between them is welded.

In the example, shown by the drawings, of the joint to be welded a flat plate constituting the tube sheet is forged to form at one side of its body portion 1 (FIGS. 2 and 10) nipple-like projections 3. Through the portion and these nipples extend from one side of the tube sheet to its opposite side openings 5 which preferably are machined to the diameter of the bores of the tubes 7 to be welded to the ends of the nipples. As illustrated (see FIG. 11) each nipple-like projection 3 at its free end portion is machined to provide it with a recess 9 for receiving the end portion of the tube, the portion of the nipple outwardly of this recess forming an annular lip 11 surrounding the end portion of the tube. The inner transverse wall of the recess is shown as inclined, preferably at an angle of about 10°, away from the squared end 13 of the tube as said wall extends radially inward from the inner wall of the lip so as to form an annular inclined surface 15 spaced from the end of the tube. A non-consumable electrode 17 is positioned within the aligned opening 5 and bore of the tube with its tip 19 in welding relation to the joint, and is rotated to cause its tip to travel circumferentially around the joint at the inner side of the joint to strike a welding arc thereagainst as it so travels. This arc will melt metal at the joint including the metal of the lip, and as the metal of the lip melts it will travel toward a hotter part of the arc, that is to say, toward the tip of the electrode through the tapered space between the end of the tube and the inclined wall surface 15 of the recess 9 to fill that space, with the result that a welded joint 21 of the approximate shape of that shown in FIG. 12 will be formed.

As shown, the gun comprises a cylindrical shell-like casing 23 (FIG. 5) provided with a radially extending hollow handle 25 for manipulation of the gun. The handle interiorly thereof carries an electric switch 27 operated by a trigger 29 for momentarily establishing a connection between the leads 31 for placing in operation the control apparatus for rotating the electrode and supplying it with welding current and for supplying shielding gas and cooling water to the gun. This control apparatus may be that disclosed by applicant's above mentioned pending application.

Supported within the casing 23 by anti-friction bearings 33 for rotation coaxially of the casing is shown a cylindrical shell 35. This shell carries a wormwheel 37 with which meshes a worm 39 (FIG. 7) rotatably supported by the casing 23. This worm is driven by a flexible cable 41 extending through a flexible shaft 43 to an electric motor forming part of the above mentioned control apparatus so that when the motor is in operation the shell 35 will be rotated.

Fitted within the shell 35 is a cylindrical block 45 of insulating material, which block at its rearward end is provided with a radially outwardly projecting annular flange 47 abutting against the rearward end of the casing 23 so as to close that end, which flange is secured to the shell 35 by screws 49.

Extending through the block 45 and projecting from each of its ends is shown a heavy walled tube 51 which is formed of metal, such as cooper, of high heat and electrical conductivities. The rearward screw-threaded end portion 53 (FIG. 8) of this tube extends through the screw-threaded bore 55 of a cylindrical metal block 57 also preferably of copper. Extending through the block 57 and a washer 59 on the tube 51, one side of which washer rests against the rearward end of the block 45 and against the opposite side of which washer rests the block 57, is shown a pair of screws 61 (FIG. 4) which normally fixedly secure the block 57 and washer to the block 45. The tube 51 extends through and slidably fits a bore 63 in the block 45. By rotating the tube relative to the block 57 it may be adjusted lengthwise relative to the block 45 and the shell 35 carried by the block 45. As shown, a lock nut 65 screw-threaded on the rearward end portion of the tube and cooperating with the rearward end of the block 57 is provided for holding the tube in its lengthwise adjusted positions.

As shown, the tube 51 adjacent its forward end is formed with an open ended hole 67 (FIG. 8) extending through its wall, and diametrically opposite said hole is formed with a hole 69 extending part away through its wall and opening into its bore. Inserted in these holes is the electrode 17 which projects from the tube radially thereof. That end of the tube which is adjacent the electrode is shown as closed by a cylindrical plug 71, which plug fits the bore of the tube and is brazed thereto. Extending through the bore of the tube from its rearward end is shown a rod 73 of lesser diameter than said bore. The rod 73 at its rearward end portion is shown as of enlarged diameter and is screw-threaded as indicated at 75, the screw-threads engaging the complementary screw-threads at the rearward end of the bore of the tube so that by rotation of the knurled head 77 fixedly carried by the rod at its rearward end exteriorly of the tube the rod, which at its forward end is adapted to bear against the electrode, may clamp the electrode between it and the plug 71.

As illustrated, the shell 35 at its forward end is integrally formed with a wall 79, with which wall is integrally formed a hollow mandrel 81, the axis of the mandrel being in alignment with that of the shell. The mandrel adjacent its juncture with the wall 79 fixedly carries a sleeve 83 which when the mandrel is inserted in the opening 5 of the tube sheet, as indicated in FIGS. 2 and 10, rotatably fits the walls of said opening so as to register the axis of rotation of the electrode with the axis of the tube 7, the forward edge 85 of the casing 23 resting against the tube sheet so as to place the tip of the electrode in the plane of the joint to be welded. As shown, the lateral wall of the mandrel is formed with a circular opening 87 through which the electrode extends as the mandrel and electrode simultaneously rotate.

As illustrated, rotatably mounted on the cylindrical block 57 is a collar or sleeve 89 opposite ends of which bear against the washer 59 and against a radially outwardly projecting annular flange 91 formed integrally with the block, the bore of the collar and the ends of the collar being in good electric and heat conductive contact with the block and its flange 91 and with the washer 59.

Carried by the collar 57 is a radially projecting nipple 93 (FIGS. 6 and 8) to which is connected a flexible hose 95 leading from a source of supply of inert gas under pressure. The nipple communicates with an annular passage 97 formed on the exterior of the block 57, which passage in turn is placed in communication with an annular passage 99, formed as an enlargement of the bore of said block, by one or more radially disposed passages 101 formed in the block. Placing the annular passage 99 in communication with the annular space 103 between the bore of the tube 51 and the electrode clamping rod 73 are one or more passages 105 extending radially through the wall of said tube. When the hose 95 is connected to the source of inert gas such gas, by reason of the construction just described, will be conducted to the space 103 at the interior of the tube 51, the collar 89 remaining stationary while the block 57 rotates so as to avoid twisting of the hose. The space 103 is placed in communication with the exterior of said tube by one or more passages 107 extending radially through the wall of the tube so that when the gun is applied to the tube sheet inert gas will flow through the hollow of the mandrel and discharge through the opening 87 of the mandrel to shield the arc during the welding operation. The free end of the mandrel is shown as closed by a disc 109 which fits the bore of the mandrel and is brazed thereto, the disc having at its outer side a radially outwardly projecting annular flange 111 which, as indicated at 113 in FIG. 10, fits the bore of the tube with a slight clearance so as to restrict any flow of gas discharged through the opening 87 of the mandrel past the end of the mandrel into the portion of the bore of the tube beyond it, and in that way maintain a slight positive pressure of the gas shielding the arc.

As further illustrated, the collar 89 at its exterior is formed with a groove 115 extending around the major portion of its circumference, into which groove is fitted and brazed a curved length of tubing 117 of metal, such as copper, of high heat and electrical conductivities. Connected to one projecting end 119 of this length of tubing is shown a flexible hose 121, preferably of rubber, for conducting cooling water to the tubing, while connected to the opposite projecting end 123 of the tubing is shown a like flexible hose 125 for conducting cooling water discharged from the tubing. The cooling water flowing through the tubing acts by thermal conduction through its walls, the collar 89, block 57, tube 51, and clamping rod 73 to cool the electrode which is in heat conducting contact with the tube 51 and rod 73. Extending through the hose 121 is shown a flexible electric cable 127 which is brazed to the projecting end 119 of the tubing 117, as shown in FIG. 6. This cable carries the welding current, and as the tubing 117 is brazed to the collar 89, and the latter is in electrical contact with the block 57, and that block is in electrical contact with the tube 51 carrying the electrode, the electrode will be effectively supplied with welding current while it rotates and while the collar 89 remains stationary to avoid twisting of the several hoses.

The supplies of inert gas, water and welding current to the gun may be and preferably are controlled automatically, for example, by the control apparatus described in applicant's hereinbefore mentioned pending application.

It will be understood that within the scope of the appended claims wide deviations may be made from the form of the invention herein described without departing from the spirit of the invention.

I claim:

1. A welding gun for arc welding from one side of a tube sheet or the like the joint between the opposite side of said sheet and the end of a tube which contacts said sheet at said opposite side about the edge of a through opening in said sheet, which gun comprises a rotary part adapted to be inserted through said opening from the first mentioned side of said sheet, an electrode carried by and rotatable with said part for striking the arc against said joint, a mandrel formed with a longitudinally extending bore receiving said part, which mandrel is adapted to be inserted with said part in said opening for registering the axis of rotation of said part with the axis of the tube, and a support for said part and mandrel adapted to be positioned at said first mentioned side of said sheet and to contact that side for registering the plane of rotation of the tip of the electrode with the plane of such joint.

2. A welding gun according to claim 1 in which the rotary part carrying the electrode is of heat conductive metal, the gun comprising cooling means for said part adapted to lie at the side of the tube sheet from which said part is inserted through the opening in said sheet for conducting heat away from the electrode carried by said part, said cooling means comprising operatively stationary means rotatably carried by said part, and fluid conducting conduits for supplying and discharging cooling fluid to and from said stationary means.

3. A welding gun according to claim 1 in which the mandrel is hollow and the part carrying the electrode is received by it in spaced relation to its walls, the support which carries said mandrel and part carrying them for simultaneous rotation at the same speeds, the free end portion of the mandrel being closed and its lateral wall being formed with an opening in registry with the tip of the electrode, the gun also comprising means for admitting an inert gas into the hollow of said mandrel from that side of the tube sheet which is adapted to be contacted by the support for said mandrel and said part for discharge through said opening for shielding the arc.

4. A welding gun according to claim 1 in which the mandrel is hollow and the part carrying the electrode is received by it in spaced relation to its walls, the support which carries said mandrel and part carrying them for simultaneous rotation at the same speeds, the free end portion of the mandrel being closed and its lateral wall being formed with an opening in registry with the tip of the electrode, the gun also compirsing means for admitting an inert gas into the hollow of said mandrel from that side of the tube sheet which is adapted to be contacted by the support for said mandrel and said part for discharge through said opening for shielding the arc, which means comprises a passage formed in said part and opening into the hollow of the mandrel, means for admitting the gas to said passage comprising operatively stationary means rotatably carried by said part and formed with passage means communicating with said passage, and a gas supply conduit connected to said stationary means and communicating with said passage means of said stationary means.

5. A welding gun according to claim 1 having means adapted to lie at that side of the tube sheet from which the rotary electrode carrying part is inserted through the opening in said sheet for connecting to said part a cable for supplying welding current to it for conduction to the electrode, such means comprising operatively stationary means rotatably carried by said part in electrically contacting relation to it, and means having provision for connection of said cable to said stationary part.

6. A welding gun for arc welding from one side of a tube sheet or the like the joint between the opposite side of said sheet and the end of a tube which contacts said sheet at said opposite side about the edge of a through opening in said sheet, which gun comprises a rotary part of electrically and heat conductive metal adapted to be inserted through said opening from the first mentioned side of said sheet, an electrode carried by and rotatable with said part, a mandrel rotatable with said part and adapted to be inserted in said opening for registering the axis of rotation of said part with the axis of the tube, a support for said part and mandrel adapted to be positioned at said first mentioned side of said sheet and to contact that side for registering the plane of rotation of the tip of the electrode with the plane of such joint; said mandrel being hollow and receiving said part in spaced relation to its lateral walls, which walls are formed with an opening in registry with the electrode tip, the free end of said mandrel being closed; said part being formed with a passage communicating with the hollow of the mandrel for discharge thereinto of gas for discharge through said opening of the mandrel for shielding the arc; means for connecting a gas supply conduit to said passage for supplying it with such gas; means for operatively connecting an electric cable to said part for supplying welding current to the electrode; means for cooling said part for conducting heat away from the electrode comprising a water supply conduit and a water discharge conduit; said means for connecting said gas supply conduit to said passage and for connecting said cable to said part comprising an operatively stationary member rotatably carried by said part in contact therewith at the side of the tube sheet adapted to be contacted by the support for said part and mandrel, which member has provision for connecting thereto said conduit and cable and is formed with passage means placing said conduit in communication with the adjacent portion of the passage of said part, said member also having provision for connecting thereto said cooling water supply and cooling water discharge conduits, and water conducting means in said member for such cooling water for cooling it whereby to cool said part.

7. A welding gun for arc welding from one side of a tube sheet or the like the joint between the opposite side of said sheet and the end of a tube which contacts said sheet at said opposite side about the edge of a through opening in said sheet, which gun comprises a rotary part adapted to be inserted through said opening from the first mentioned side of said sheet, an electrode carried by and rotatable with said part for striking the arc against said joint, a mandrel formed with a longitudinally extending bore receiving said part, which mandrel is adapted to be inserted with said part in said opening for registering the axis of rotation of said part with the axis of the tube, said rotary part and said axis-registering mandrel being spaced apart radially of said axis to permit flow of inert gas from a supply to the vicinity of the electrode for discharge thereat for shielding the arc during the welding operation, and a support for said part and said mandrel adapted to be positioned at said first mentioned side of said sheet and to contact that side for registering the plane of rotation of the tip of the electrode with the plane of such joint.

8. In combination; a housing, an electrically conductive member rotatably mounted in said housing, means for rotating said member, electrode holder means mounted on and rotatable with said member, a welding electrode having a tip secured to said member by said holder means, adjustable means for varying the distance between the axis of rotation of said member and said electrode tip, means for supplying arc shielding gas to said electrode tip, means to cool said member at least adjacent the mounting of the holder means thereon, said housing having a work engaging surface, and means for adjusting the relative locations of said work engaging surface and said electrode tip.

References Cited in the file of this patent

UNITED STATES PATENTS

| | | |
|---|---|---|
| 1,128,116 | Dralle | Feb. 9, 1915 |
| 1,809,653 | Wagner | June 9, 1931 |
| 1,949,251 | Gilbert | Feb. 27, 1934 |
| 2,606,267 | McElrath | Aug. 5, 1952 |
| 2,813,193 | Bichsel | Nov. 12, 1957 |
| 2,818,493 | Pilia et al. | Dec. 31, 1957 |